United States Patent
Hwang et al.

(10) Patent No.: US 9,781,171 B2
(45) Date of Patent: Oct. 3, 2017

(54) REGISTRATION METHOD FOR MANAGING NAT SHUTDOWN

(71) Applicant: National Taipei University of Technology, Taipei (TW)

(72) Inventors: Shaw Hwa Hwang, Taipei (TW); Cheng Yu Yeh, Taipei (TW); Kuan Lin Chen, Taipei (TW); Yao Hsing Chung, Taipei (TW); Chi Jung Huang, Taipei (TW); Li Te Shen, Taipei (TW); Shun Chieh Chang, Taipei (TW); Bing Chih Yao, Taipei (TW); Chao Ping Chu, Taipei (TW); Ning Yun Ku, Taipei (TW); Tzu Hung Lin, Taipei (TW); Ming Che Yeh, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 513 days.

(21) Appl. No.: 14/558,772

(22) Filed: Dec. 3, 2014

(65) Prior Publication Data
US 2016/0127425 A1  May 5, 2016

(51) Int. Cl.
*H04L 29/06* (2006.01)
*H04L 29/12* (2006.01)

(52) U.S. Cl.
CPC ...... *H04L 65/1073* (2013.01); *H04L 61/2553* (2013.01); *H04L 61/1529* (2013.01); *H04L 61/2514* (2013.01)

(58) Field of Classification Search
CPC ........... H04L 65/1073; H04L 61/152; H04L 61/1529; H04L 61/2553; H04L 61/2514
USPC ........................................... 370/352
See application file for complete search history.

(56) References Cited

U.S. PATENT DOCUMENTS

| | | | |
|---|---|---|---|
| 2009/0109963 A1* | 4/2009 | Tanizawa | ............ H04L 12/66 370/352 |
| 2010/0217837 A1 | 8/2010 | Ansari et al. | |
| 2013/0272253 A1* | 10/2013 | Veenstra | .......... H04W 72/0486 370/329 |

\* cited by examiner

*Primary Examiner* — Walter Divito
*Assistant Examiner* — Anthony Luo
(74) *Attorney, Agent, or Firm* — Bacon & Thomas, PLLC

(57) ABSTRACT

The present invention provides a registration method for managing NAT shutdown. In Internet communication field, a user must perform registrations intermittently to a server through NAT, and increase the time interval of registration step by step. But NAT itself will shutdown if no packet is passed through for a long period. The registration method of the present invention is to adjust the time interval of registration step by step so that the time interval of registration is slightly less than the shutdown time of NAT, and then fix the time interval of registration to assure that all of the Invite packet can pass through without blocking up by the shutdown of NAT.

2 Claims, 5 Drawing Sheets

REGISTRATION METHOD FOR MANAGING NAT SHUTDOWN

FIELD OF THE INVENTION

The present invention relates to a registration method in Internet communication field, and more particularly to a registration method for managing NAT (Network Address Translator) shutdown.

BACKGROUND OF THE INVENTION

In Internet communication field, such as VoIP or IP camera, in order to assure that the users are online continually so as to make both sides connect with each other, the users are requested to perform registration intermittently to confirm interconnection.

Referring to FIG. 1, if PC1 and PC2 are going to conduct interconnection with each other through VoIP or IP camera, both sides must perform registrations intermittently to the server 3 through NAT 4 or NAT 5 respectively. The server 3 will then respond to PC1 and PC2 respectively to express that interconnection is achieved (step ① registration packet to and fro). When PC 2 is going to connect with PC 1, an Invite packet is sent to the server 3 through NAT 5 (step ②), then the server 3 sends the Invite packet to PC 1 through NAT 4 (step ③). PC1 will send a responding packet to the server 3 through NAT 4 (step ④), then the server 3 sends the responding packet to PC 2 through NAT 5 (step ⑤).

Referring to FIG. 2, the server 3 is not only faced by PC 1 and PC 2, but also faced by thousands of user. In order to reduce the load of the server 3 for receiving registrations continuously, it is a natural development in Internet communication that the users are requested to increase the time interval of registration intermittently. But if NAT 4 and NAT 5 find that no packet is passed through for a long time (T2 time), then NAT 4 and NAT 5 will shut down automatically, while the server 3, PC 1 and PC 2 are all ignorant of the status. Therefore the Invite packets in step ② or step ③ cannot be sent, and must wait till the next time PC1 or PC2 sends a registration packet to open NAT 4 or NAT 5.

Referring to FIG. 3, the interactions between PC 1 and the server 3 are used as an example for description, the interactions between PC 2 and the server 3 can be applied by analogy. When PC 1 sends a registration forward packet, T1 time information is carried for sending to the server 3 through NAT 4. The server 3 then responds with a registration backward packet, and knows that PC 1 will register again after T1 time.

PC 1 waits for T1 time, then sends the second registration forward packet, a T3 time information is carried for sending to the server 3 through NAT 4, T3>T2. The server 3 then responds with a registration backward packet, and knows that PC 1 will register again after T3 time.

The shutdown time for NAT 4 is T2, T1<T2<T3. If NAT 4 itself finds that no packet is passed through within T2 time, then NAT 4 will shutdown automatically, while the server 3, PC 1 are ignorant of the status. At this time, if PC 2 sends an Invite packet to the server 3 through NAT 5 after T2 time, the Invite packet will be blocked up by NAT 4 when the Invite packet is sent by the server 3 to PC 1 through NAT 4.

After T3 time, PC 1 sends the third registration forward packet so as to open NAT 4, a T4 time information is carried for sending to the server 3 through NAT 4, T4>T3. Therefore a vicious circle is formed so that PC 2 cannot send the Invite packet to PC 1 through NAT 4.

SUMMARY OF THE INVENTION

The object of the present invention is to provide a registration method for managing NAT (Network Address Translator) shutdown. The time interval of registration is adjusted step by step so that the time interval of registration is slightly less than the shutdown time of NAT, and then fix the time interval of registration to assure that all of the Invite packet can pass through without blocking up by the shutdown of NAT.

In an Internet communication system, it comprises: a first PC (personal computer); a second PC; a server, interposed between the first PC and the second PC; a first NAT, interposed between the first PC and the server, a shutdown time for NAT is T2; a second NAT, interposed between the second PC and the server; the registration method for managing NAT shutdown comprises steps as below:

a. the first PC sends a registration forward packet carried with a T1 time information for sending to the server through the first NAT;

b. the server then sends a registration backward packet to the first PC through the first NAT;

c. after the first PC receives the registration backward packet from the server, the first PC knows that a registration testing packet sent by the server will be received after T1 time;

d. T1 time after the step c., the server sends the registration testing packet to the first PC through the first NAT;

e. if the first PC receives the registration testing packet, it means that the first NAT is not shutdown, T1<T2, so the T1 time is increased to T3 time, the first PC then sends immediately a response for the registration testing packet carried with the T3 time information to the server through the first NAT;

f. after the server receives the response for the registration testing packet, the server knows that the registration channel is OK, and will send again a registration testing packet to the first PC through the first NAT after T3 time;

g. T2 time after the step f. the first NAT is shutdown, T3 time after the step f. the server sends the registration testing packet to the first PC through the first NAT, if it is blocked up by the first NAT, then T2≤T3, the server cannot get a response for the registration testing packet from the first PC, so the server thinks that the first PC 1 is off-line;

h. T3 time after the step f. the first PC cannot receive the registration testing packet from the server, so the first PC renews registration, the first PC sends a registration forward packet carried with a T2' time information for sending to the server through the first NAT, T1<T2'<T3;

i. the server finds that the first PC renews registration, so responds according to the steps b., c., d., aforementioned to the first PC, T1 is replaced by T2';

j. as the step e. is reached again, if the first PC receives the registration testing packet, it means that the first NAT is not shutdown, T2'<T2, thereafter T2' is fixed to assure that an Invite packet from the second PC can be sent to the first PC through the second NAT, the server and the first NAT; if T2'≥T2, then go as the step h. to reduce T2' time again, by way of trial and error, T2' will be adjusted to be slightly less than T2, and then to be fixed to assure that the Invite packet from the second PC can be sent to the first PC through the second NAT, the server and the first NAT.

In the step h., T3 time after the step f. the first PC cannot receive the registration testing packet from the server, so the first PC renews registration, changes the T3 time back to T1 time, and fix the T1 time thereafter.

DETAILED DESCRIPTIONS OF THE PREFERRED EMBODIMENTS

Figure 1:
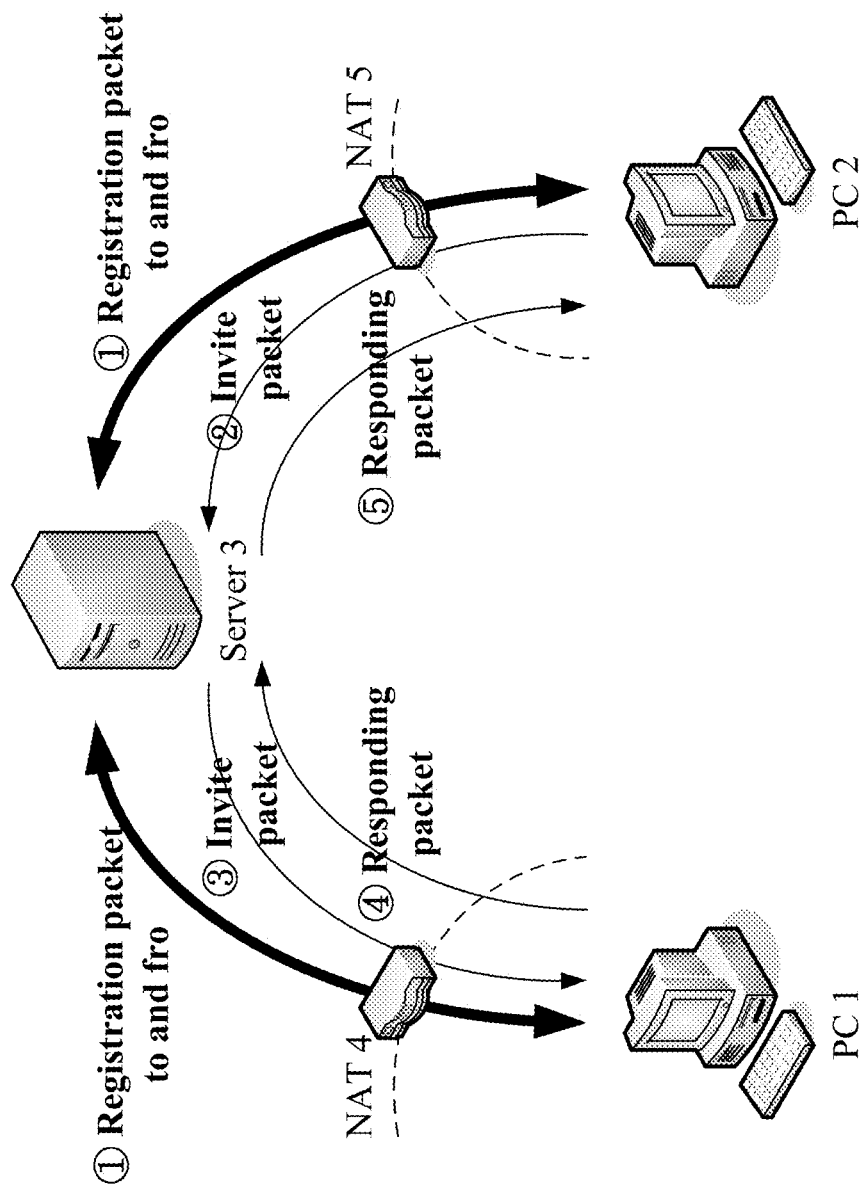
FIG. 1 shows schematically the interconnections in Internet communication.
Figure 2:
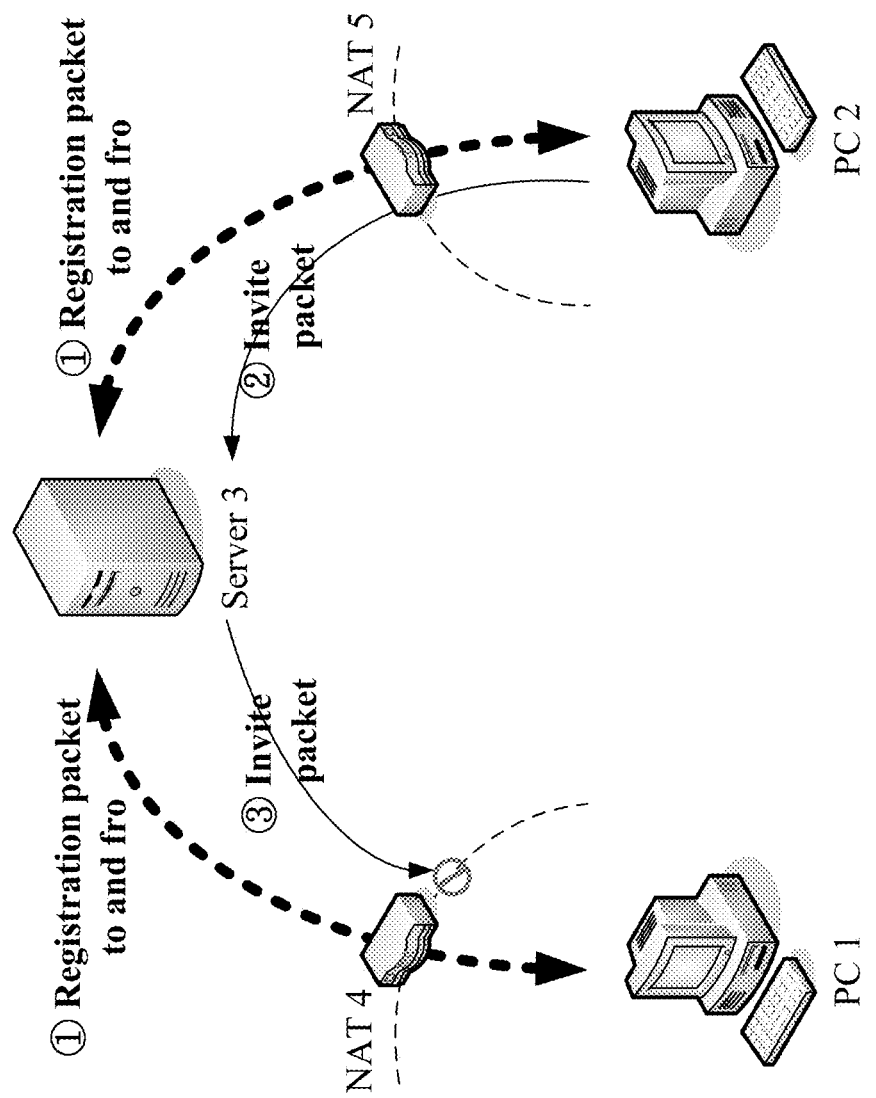
FIG. 2 shows schematically the shutdown of NAT in Internet communication.
Figure 3:
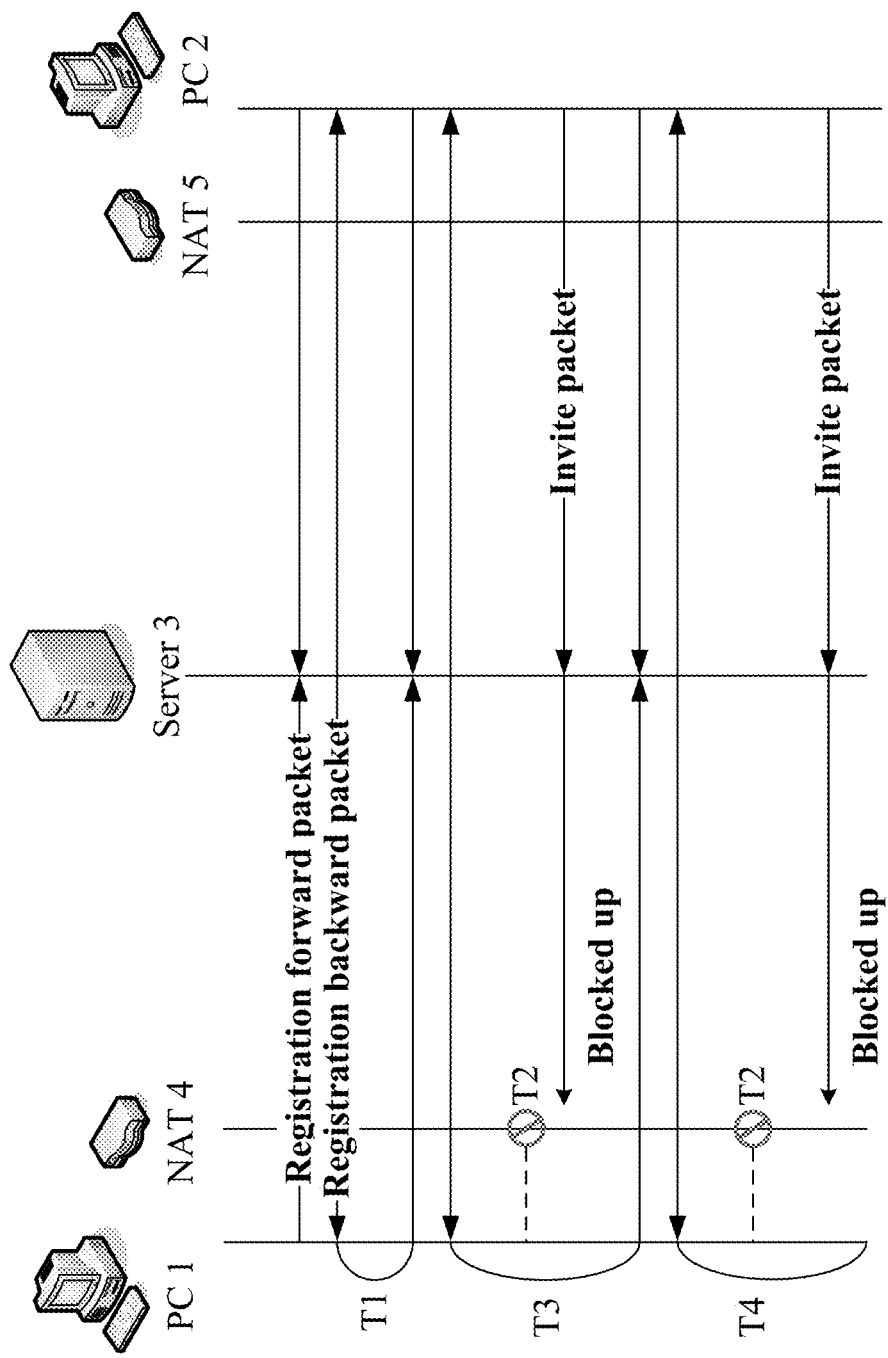
FIG. 3 shows schematically the time interval of registration is increased by the user in Internet communication.
Figure 4:
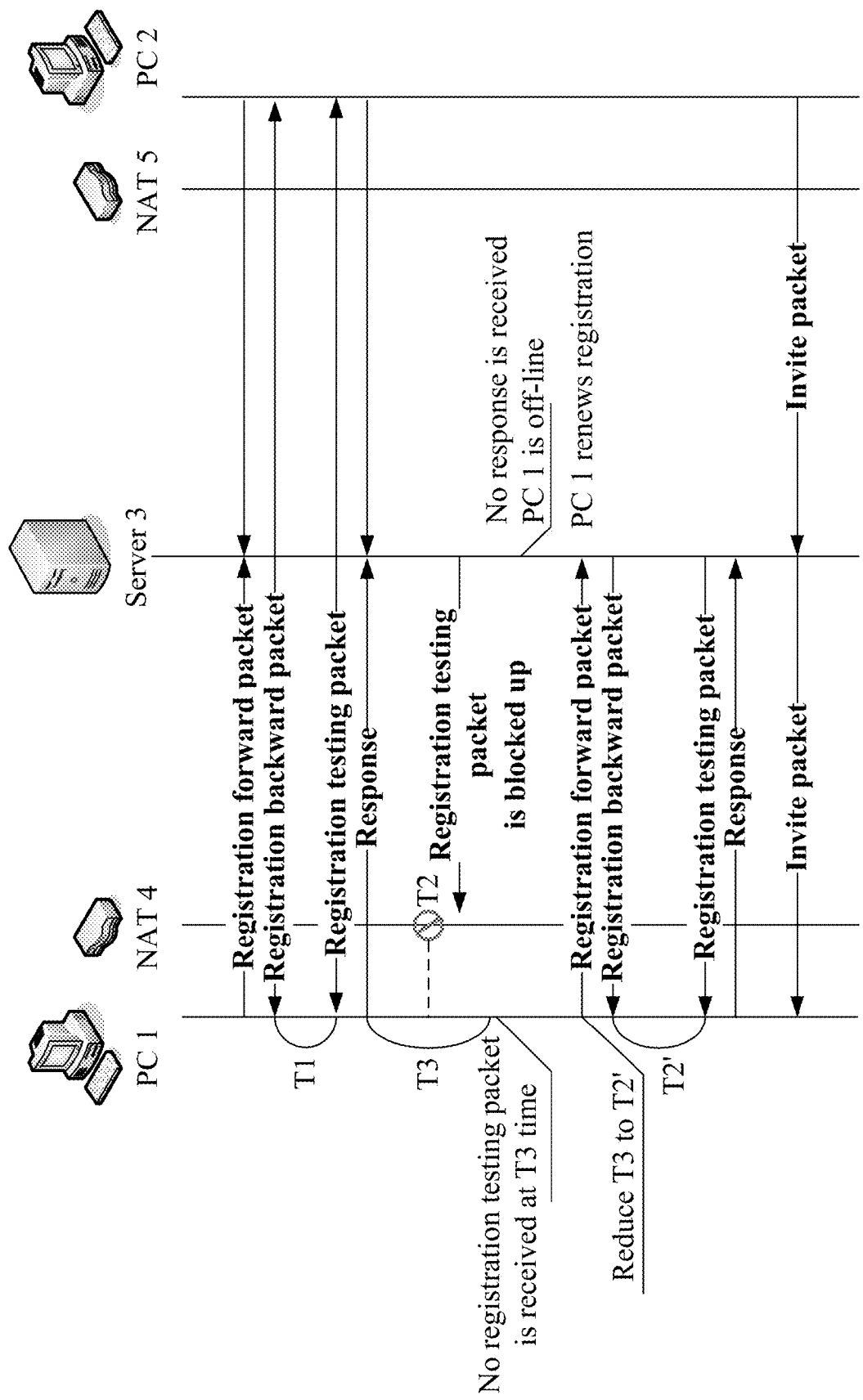
FIG. 4 shows schematically the registration method for managing NAT shutdown according to the present invention.

Referring to FIG. 4, an embodiment according to the present invention is shown to describe the registration method for managing NAT shutdown. The interactions between PC 1 and the server 3 are used as an example for description, the interactions between PC 2 and the server can be applied by analogy.

The first step, PC 1 sends a registration forward packet carried with T1 time information for sending to the server 3 through NAT 4. The server 3 then responds with a registration backward packet. After PC 1 receives the registration backward packet from the server 3, PC 1 knows that a registration testing packet sent by the server 3 will be received after T1 time.

The second step, after T1 time, the server 3 sends a registration testing packet to PC 1 through NAT 4. If PC 1 receives the registration testing packet, it means that NAT 4 is not shutdown, so the time interval for registration is increased to T3, PC 1 then sends immediately a response for the registration testing packet carried with the T3 time information to the server 3 through NAT 4. After the server 3 receives the response for the registration testing packet, the server 3 knows that the registration channel is OK, and will send again a registration testing packet to PC1 through NAT 4 after T3 time. PC 1 and the server 3 are ignorant of the shutdown time T2 of NAT 4. T3≥T2.

The third step, after T2 time the NAT 4 is shutdown, the server 3 sends a registration testing packet to PC 1 through NAT 4 after T3 time, but it is blocked up by NAT 4. The server 3 cannot get a response for the registration testing packet from PC 1, so the server 3 thinks that PC 1 is off-line. PC 1 cannot receive a registration testing packet from the server 3 after T3 time, so go back to the first step aforementioned to renew the registration, and reduce the T3 time to T2', T1<T2'<T3. The server 3 finds that PC 1 renews the registration, so responds according to the first step aforementioned to PC 1.

If T2'<T2, then go as the second step to increase T2' time a little, while maintain T2' time is also OK. If T2'≥T2, then go as the third step to reduce T2' time again. By way of trial and error, T2' will be adjusted to be slightly less than T2, and then to be fixed to assure that all Invite packets from PC 2 can be sent to PC 1 through NAT 5, the server 3 and NAT 4.

Another embodiment is that: in the third step, PC 1 cannot receive a registration testing packet from the server 3 after T3 time, so go back to the first step aforementioned to renew the registration, and change the T3 time back to T1 time, and fix the T1 time thereafter.

By way of example to illustrate T1, T2, T3, T2', T4, suppose that T2=35 seconds, T1=30 seconds, increment is 30 seconds, so T3=60 seconds, T4=90 seconds. At T3, since T3 exceeds T2, T3 is reduced to T2' by 15 seconds decrement, therefore T2'=45 seconds. But T2' still exceeds T2 (=35 seconds), so decrease again 7.5 seconds to make T2'=37.5 seconds. But T2' still exceeds T2 (=35 seconds), so decrease again 3.75 seconds to make T2'=33.75 seconds, which is less than T2 (=35 second), so successful.

Figure 5:
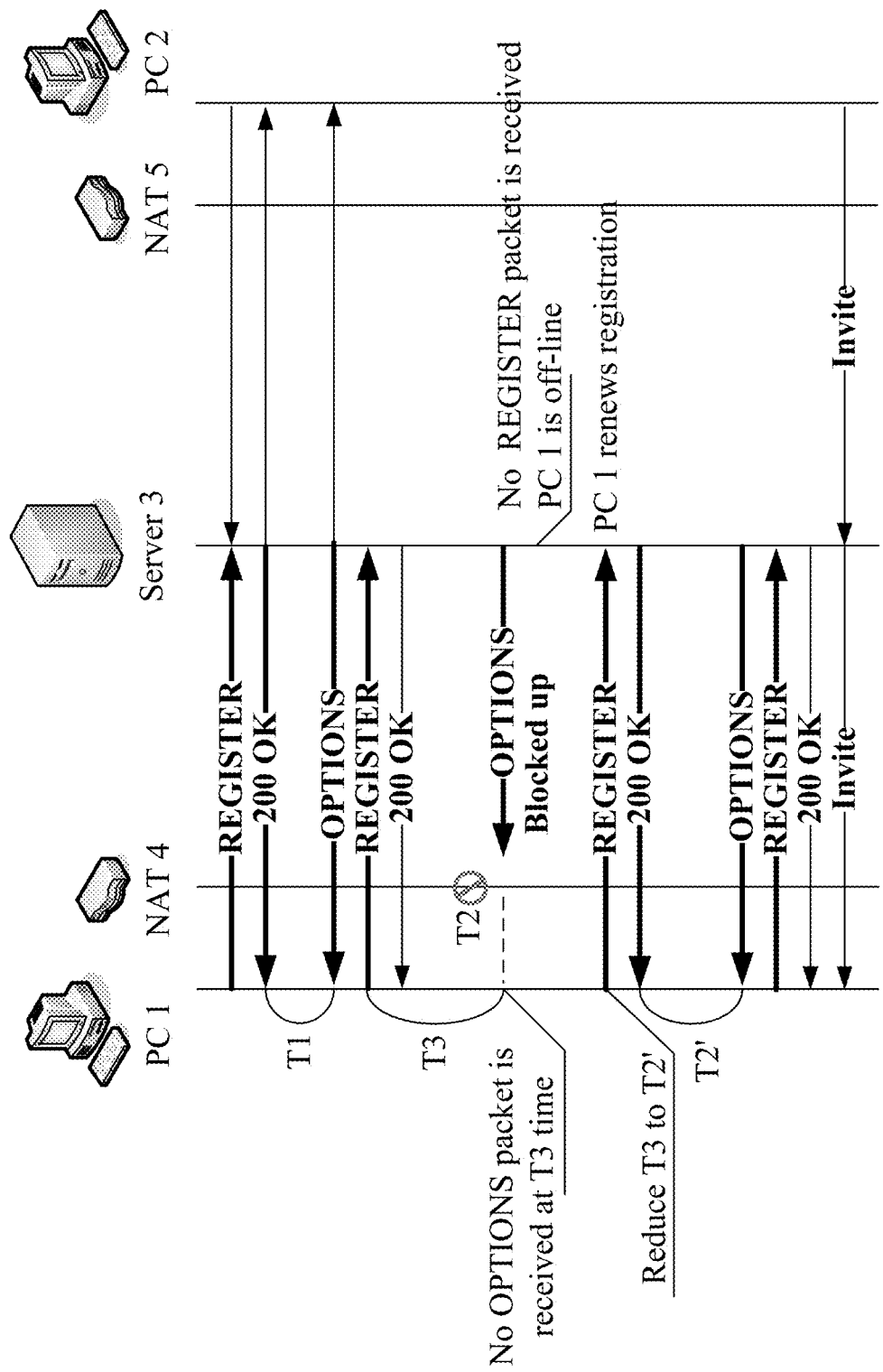
FIG. 5 shows schematically that SIP (Session Initiation Protocol) is used as an example to describe the registration method for managing NAT shutdown according to the present invention.

Referring to FIG. 5, SIP (Session Initiation Protocol) is used as an example to describe the registration method for managing NAT shutdown according to the present invention. A conventional SIP registration comprises a REGISTER packet and a 200 OK packet.

The first step, PC 1 sends a REGISTER packet (similar to the registration forward packet in FIG. 4) carried with T1 time information for sending to the server 3 through NAT 4. The server 3 then responds with a 200 OK packet (similar to the registration backward packet in FIG. 4). After PC 1 receives the 200 OK packet from the server 3, PC 1 knows that an OPTIONS packet (similar to the registration testing packet in FIG. 4) sent by the server 3 will be received after T1 time.

The second step, after T1 time, the server 3 sends an OPTIONS packet to PC 1 through NAT 4. If PC 1 receives the OPTIONS packet, it means that NAT 4 is not shutdown, so the time interval for registration is increased to T3, PC 1 then sends immediately a REGISTER packet (similar to the response for the registration testing packet in FIG. 4) carried with T3 time information to the server 3 through NAT 4. After the server 3 receives the REGISTER packet, the server 3 knows that the registration channel is OK, and will responds with a 200 OK packet (SIP rule). The server 3 will sends an OPTIONS packet to PC1 through NAT 4 after T3 time. PC 1 and the server 3 are ignorant of the shutdown time T2 of NAT 4. T3≥T2.

The third step, after T2 time the NAT 4 is shutdown, the server 3 sends an OPTIONS packet to PC 1 through NAT 4 after T3 time, but it is blocked up by NAT 4. The server 3 cannot get a REGISTER packet from PC 1, so the server 3 thinks that PC 1 is off-line. PC 1 cannot receive an OPTIONS packet from the server 3 after T3 time, so go back to the first step aforementioned to renew the registration, and reduce the T3 time to T2', T1<T2'<T3. The server 3 finds that PC 1 renews the registration, so responds according to the first step aforementioned to PC 1.

If T2'<T2, then go as the second step to increase T2' time a little, while maintain T2' time is also OK. If T2'≥T2, then go as the third step to reduce T2' time again. By way of trial and error, T2' will be adjusted to be slightly less than T2, and then to be fixed to assure that all Invite packets from PC 2 can be sent to PC 1 through NAT 5, the server 3 and NAT 4.

Another embodiment is that: in the third step, PC 1 cannot receive an OPTIONS packet from the server 3 after T3 time, so go back to the first step aforementioned to renew the registration, and change the T3 time back to T1 time, and fix the T1 time thereafter.

Besides SIP, other Internet communication protocols that includes NAT, such as RTSP (Real Time Streaming Protocol), can also use the registration method of the present invention for managing NAT shutdown.

The scope of the present invention depends upon the following claims, and is not limited by the above embodiments.

What is claimed is:

1. A registration method for managing NAT (Network Address Translator) shutdown, in an Internet communication system, comprising:
   a first PC (personal computer);
   a second PC;
   a server, interposed between the first PC and the second PC;
   a first NAT, interposed between the first PC and the server, a shutdown time for NAT is T2;
   a second NAT, interposed between the second PC and the server;
   the registration method comprising steps as below:
   a. the first PC sends a registration forward packet carried with a T1 time information for sending to the server through the first NAT;
   b. the server then sends a registration backward packet to the first PC through the first NAT;
   c. after the first PC receives the registration backward packet from the server, the first PC knows that a registration testing packet sent by the server will be received after T1 time;
   d. T1 time after the step c., the server sends the registration testing packet to the first PC through the first NAT;
   e. if the first PC receives the registration testing packet, it means that the first NAT is not shutdown, T1<T2, so the T1 time is increased to T3 time, the first PC then sends immediately a response for the registration testing packet carried with the T3 time information to the server through the first NAT;
   f. after the server receives the response for the registration testing packet, the server knows that the registration channel is OK, and will send again a registration testing packet to the first PC through the first NAT after T3 time;
   g. T2 time after the step f. the first NAT is shutdown, T3 time after the step f. the server sends the registration testing packet to the first PC through the first NAT, if it is blocked up by the first NAT, then T2≤T3, the server cannot get a response for the registration testing packet from the first PC, so the server thinks that the first PC is off-line;
   h. T3 time after the step f. the first PC cannot receive the registration testing packet from the server, so the first PC renews registration, the first PC sends a registration forward packet carried with a T2' time information for sending to the server through the first NAT, T1<T2'<T3;
   i. the server finds that the first PC renews registration, so responds according to the steps b., c., d., aforementioned to the first PC, T1 is replaced by T2';
   j. as the step e. is reached again, if the first PC receives the registration testing packet, it means that the first NAT is not shutdown, T2'<T2, thereafter T2' is fixed to assure that an Invite packet from the second PC can be sent to the first PC through the second NAT, the server and the first NAT; if T2'≥T2, then go as the step h. to reduce T2' time again, by way of trial and error, T2' will be adjusted to be less than T2, and then to be fixed to assure that the Invite packet from the second PC can be sent to the first PC through the second NAT, the server and the first NAT.

2. The registration method for managing NAT shutdown according to claim 1, wherein in the step h. T3 time after the step f. the first PC cannot receive the registration testing packet from the server, so the first PC renews registration, changes the T3 time back to T1 time, and fixes the T1 time thereafter.

* * * * *